March 17, 1970     R. H. VAN HAAGEN     3,500,547

PRECISE CALIPERS WITH AUTOMATIC PRINTOUT

Filed May 24, 1967                          2 Sheets-Sheet 1

INVENTOR.
Richard H. van Haagen
BY
Attorney

March 17, 1970  R. H. VAN HAAGEN  3,500,547
PRECISE CALIPERS WITH AUTOMATIC PRINTOUT
Filed May 24, 1967  2 Sheets-Sheet 2
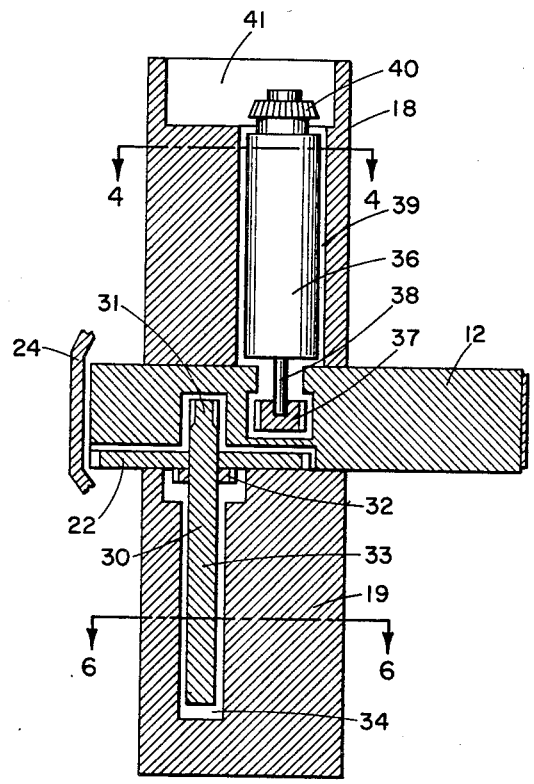
Fig. 3
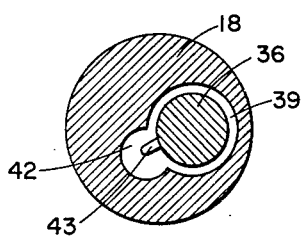 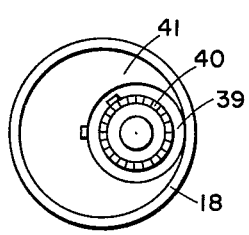 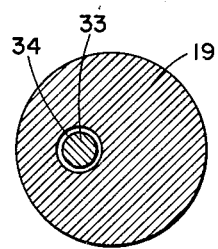
Fig. 4  Fig. 5  Fig. 6
INVENTOR.
Richard H. van Haagen
BY
Attorney 3,500,547
Patented Mar. 17, 1970

United States Patent Office

3,500,547
PRECISE CALIPERS WITH AUTOMATIC PRINTOUT
Richard H. van Haagen, Lexington, Mass., assignor to Arthur D. Little, Inc., Cambridge, Mass., a corporation of Massachusetts
Filed May 24, 1967, Ser. No. 640,886
Int. Cl. G01b 5/00
U.S. Cl. 33—143                    1 Claim

ABSTRACT OF THE DISCLOSURE

A vernier calipers with high precision, and accuracy within the range of about one-tenth of a millimeter. Movable spaced pins are used to measure linear dimensions and these pins are mechanically linked to electrical resistance measuring means, the resistance of which is a linear function of the pin spacing. Readings may be done visually or may be automatically recorded and printed out upon actuation.

BACKGROUND OF THE INVENTION

In doing experimental work it is often necessary to obtain the dimensions of articles or living organisms with speed and accuracy. This is normally accomplished through the use of vernier calipers which may or may not be associated with automatic printout devices. However, most commercially available rapidly operating calipers are not built with sufficient precision to determine or to record the dimensions of the order of tenths of a millimeter over distances of tens of centimeters. Those devices which have the required precision are not freely movable as hand-operated instruments which can readily be brought into contact with such living or preserved organisms as insects and small fish or other zoological specimens. It would therefore be desirable to have available a device capable of making precise measurements which was precision built, had an accuracy in the range of about one-tenth of a millimeter, easy to read and readily adaptable to incorporation into an automatic printout system.

SUMMARY OF THE INVENTION

It is therefore a primary object of this invention to provide an improved measuring device which is a freely movable, hand-operated instrument being capable of achieving precision in the range of about one-tenth millimeter over the range of tens of centimeters. It is another object of this invention to provide such a measuring device which may be coupled to an automatic printout system. It is another important object of this invention to provide improved vernier calipers which are precision built, have sharp measuring points, good accuracy and can be read either visually or from an electrically actuated device. Other objects of the invention will in part be obvious and will in part be apparent hereinafter.

The invention accordingly comprises the features of construction, combination of elements and arrangement of parts which will be exemplified in the construction hereinafter set forth, and the scope of the invention will be indicated in the claims.

For a fuller understanding of the nature and objects of the invention reference should be had to the following detailed description taken in connection with the accompanying drawings in which FIG. 1 is a side elevational view of the vernier calipers of this invention;

FIG. 3 is a cross section of the calipers taken along line 3—3 of FIG. 2;

FIG. 4 is a cross section of the upper housing taken along line 4—4 of FIG. 3;

FIG. 5 is a top plan view of the calipers of FIG. 3;

FIG. 6 is a cross section of the lower housing taken along line 6—6 of FIG. 3.

BRIEF DESCRIPTION OF THE DRAWINGS AND OF PREFERRED EMBODIMENTS

Figure 1:
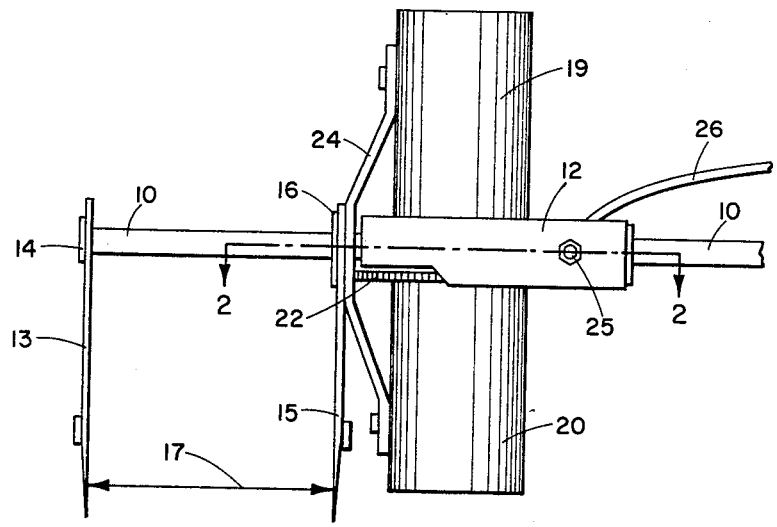

FIG. 1 is a side elevational view of the vernier calipers of this invention. It will be seen to comprise a straight elongated rack 10 along which pinions move, these pinions being located in pinion housing 12. An elongated measuring pin 13 is rigidly affixed through a suitable device such as a screw 14 at or near the end of rack 10. A second corresponding elongated measuring pin 15 is affixed in rigid relationship to the end of the pinion housing 12 through a bracket 24 and screw 16. Moving the rack 10 back and forth through the pinion housing 12 determines the position of the second inner elongated measuring pin 15 relative to the first outer elongated measuring pin 13 and hence the distance 17 between the pins which is the dimension to be determined. It is, of course, necessary that calipers which are to be used to measure extremely small dimensions have measuring pins which are rigid and which terminate at the measuring end in very fine points.

Affixed to the upper side of the pinion housing 12 is an upper housing 19 containing the potentiometer, its terminals and connections. Affixed to the lower side of the pinion housing 12 is a lower housing 20 which serves as a bearing assembly housing. These housings are mounted through screws not shown which are located within the housing components. The entire pinion housing is moved relative to the rack 10 by turning the vernier thumb wheel drive 22, and the bracket 24 is mounted on the two housings 19 and 20. A potentiometer actuation button 25 is placed on one side of the pinion housing 12 and a flexible cord 26 leads from the connections of the potentiometer to the electronic system to be described below in connection with the description of FIG. 7.

Figure 2:
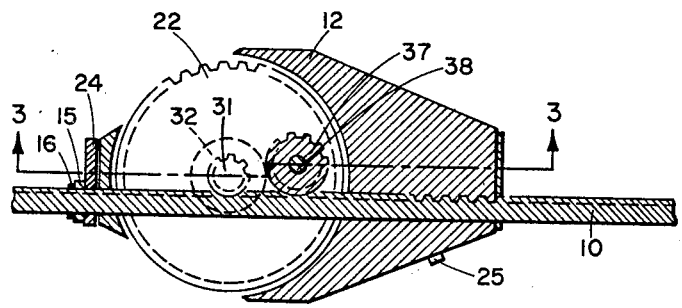
FIG. 2 is a transverse cross section through the vernier calipers of FIG. 1 taken along line 2—2 of that figure.

FIGS. 2 and 3 are longitudinal and transverse cross sections, respectively, of the calipers of FIG. 1. In all of the figures like numerals refer to like elements. As the vernier thumb wheel drive 22 is moved manually the entire pinion housing, along with measuring point 16, is moved back and forth along the rack 10. This accomplished through the construction in which the vernier thumb wheel drive 22 is mounted on a shaft 30, the upper end of which is machined to form a driving pinion 31 engaging the teeth of the rack 10. A bearing 32 is provided for the lower end 33 of the shaft which extends into a well 34 drilled within the solid housing 19. This housing is preferably formed of some material such as nylon or teflon which will be resistant to many different atmospheres to which the calipers may be exposed.

As the rack is moved back and forth through the pinion housing the potentiometer 36 is moved by the action of pinion 37 which engages rack 10 and which in turn is mounted on a shaft 38 connected to the wiring of the potentiometer 36. The potentiometer is located in a well 39 in housing 18. The potentiometer may have a visual vernier scale 40 which extends into a well 41 drilled into the upper housing 18. This upper housing 18 is also preferably formed of a solid nylon or Teflon and essentially balances in size and weight the housing 19.

As will be seen in FIG. 4, the well 39 is so shaped as to provide an adjacent chamber 42 into which the termials 43 of the potentiometer may extend and be connected wiht suitable lead wires which are encased in lexible cord 26.

The potentiometer 36 which is located in upper housing 8 may be any suitable commercially available device capable of registering a change in voltage with the rotation of pinion 37 by movement along rack 10. As an example of a suitable device for this purpose, I may cite a cylindrically shaped, ⅞-inch diameter helically wound potentiometer sold by Beckman Instruments, Inc., under their trade name "Helipot" and designated as their 10-turn model 7246. It has a resistance from 10 to 50,000 ohms with a standard independent linearity of ±.25%.

Figure 7:
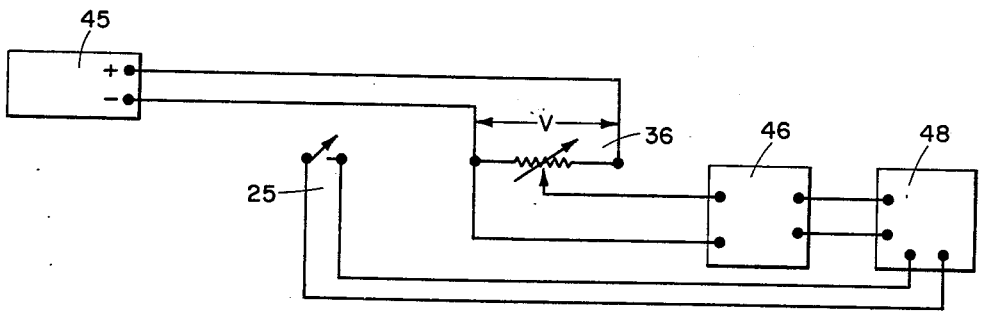
FIG. 7 is a circuit diagram of an associated printout system.

A suitable circuit to provide automatic printout of measurements is illustrated in FIG. 7. A constant voltage source 45 supplies power to potentiometer 36. The voltage V thus applied by the constant voltage source is adjusted at the source so that the potential gradient on the variable resistor (potentiometer) is an integral voltage per unit of distance to be measured, e.g., one volt per millimeter. In one apparatus constructed according to this invention, 40 volts was applied to the resistor for a calipers designed to measure up to 40 centimeters in length.

The output of the potentiometer is connected to a voltmeter 46 (either of the analog or digital type) and the voltmeter is in turn connected to a suitable printout system 48, these components being commercially available. The switch 25 is connected to the printer and when the proper dimension of the object to be measured is determined by moving measuring pin 16, the switch 25 is closed and the printer is actuated to print a figure which is a function of the resistance.

As an alternative to the use of the voltmeter 46 and printout system 48, a voltmeter which indicates voltages or dimensions may be used, the results being visually observed and then recorded if desired.

In another modification the constant voltage source may be eliminated and a voltmeter of the type which is a "ratio meter" used as the voltmeter 46. The readings of such a voltmeter will then be directly proportional to the angular rotation of the potentiometer.

The apparatus of this invention is particularly well suited to making a long series of measurements for each data item may be recorded and printed out without the necessity for interrupting work to lay down the calipers and write down the number. This in turn eliminates errors due to transcription or faulty visual readings.

The symmetrical design also allows use of the calipers in either hand for either right-handed or left-handed persons. Alternatively, the calipers may be mounted on a fixed stand, and the object to be measured brought to the calipers.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as llustrative and not in a limiting sense.

I claim:
1. A precision measuring apparatus for determining linear dimensions, comprising in combination
   (a) an elongated rack;
   (b) first and second measuring pins, said first pin being rigidly affixed to said rack, said second pin being movable with respect to said first pin to determine a linear dimension to be measured;
   (c) a pinion housing having said second measuring pin affixed thereto and being adapted for movement along said rack;
   (d) a helically wound potentiometer having associated therewith a first pinion within said pinion housing, said first pinion being arranged for engagement with said rack, the resistance of said variable resistor means being a linear function of the distance traveled by said pinion housing along said rack;
   (e) a hand actuatable thumb wheel engaging a second pinion within said pinion housing, said second pinion being adapted to move said pinion housng along said rack;
   (f) a voltmeter for measuring said resistance representing said distance traveled and hence said linear dimension;
   (g) constant voltage source means associated with said potentiometer and printer means with switching means associated with said voltmeter, whereby actuation of said switching means causes said printing means to record an item of data representative of said dimension; and
   (h) upper and lower, essentially balanced, housing blocks attached to said pinion housing means, one of said blocks containing said potentiometer.

References Cited

UNITED STATES PATENTS

| 3,344,527 | 10/1967 | Murphy | 33—172 |
| 3,324,437 | 6/1967 | Heller | 338—129 |
| 3,015,956 | 1/1962 | Eklund | 73—386 |

FOREIGN PATENTS 1,354,153  12/1962  France.

SAMUEL S. MATTHEWS, Primary Examiner